(12) United States Patent
Johnston (10) Patent No.: US 9,141,344 B2
(45) Date of Patent: Sep. 22, 2015

(54) HOVER HELP SUPPORT FOR APPLICATION SOURCE CODE

(75) Inventor: Jeffrey Grant Johnston, Scarborough (CA)

(73) Assignee: Red Hat, Inc., Raleigh, NC (US)

( * ) Notice: Subject to any disclaimer, the term of this patent is extended or adjusted under 35 U.S.C. 154(b) by 1236 days.

(21) Appl. No.: 12/701,252

(22) Filed: Feb. 5, 2010

(65) Prior Publication Data

US 2011/0197178 A1    Aug. 11, 2011

(51) Int. Cl.
*G06F 9/44* (2006.01)
*G06F 3/00* (2006.01)
*G06F 17/22* (2006.01)
*G06F 17/30* (2006.01)

(52) U.S. Cl.
CPC .. *G06F 8/33* (2013.01); *G06F 8/73* (2013.01); *G06F 17/2247* (2013.01); *G06F 17/30905* (2013.01)

(58) Field of Classification Search
CPC ............... G06F 8/10; G06F 8/20; G06F 8/71; G06F 8/73; G06F 8/75
USPC .......................................... 717/101, 120, 124
See application file for complete search history.

(56) References Cited

U.S. PATENT DOCUMENTS

| 6,467,081 | B2* | 10/2002 | Vaidyanathan et al. | 717/123 |
| 6,502,233 | B1* | 12/2002 | Vaidyanathan et al. | 717/101 |
| 7,120,863 | B1* | 10/2006 | Wang | 715/227 |
| 7,581,172 | B2* | 8/2009 | Ozzie et al. | 715/234 |
| 7,797,627 | B2* | 9/2010 | Fong et al. | 715/249 |
| 8,191,040 | B2* | 5/2012 | Hejlsberg et al. | 717/114 |
| 2006/0101397 | A1* | 5/2006 | Mercer et al. | 717/120 |
| 2006/0190814 | A1* | 8/2006 | Collie et al. | 715/513 |
| 2007/0168909 | A1* | 7/2007 | Vaidyanathan et al. | 717/100 |
| 2008/0282152 | A1* | 11/2008 | McKnight et al. | 715/255 |
| 2009/0132937 | A1* | 5/2009 | Allen et al. | 715/762 |
| 2010/0257507 | A1* | 10/2010 | Warren | 717/106 |

* cited by examiner

*Primary Examiner* — Don Wong
*Assistant Examiner* — Mohammad Kabir
(74) *Attorney, Agent, or Firm* — Lowenstein Sandler LLP (57) ABSTRACT

A method and apparatus for proving hover help support is described. In one embodiment, the method includes loading a documentation file generated from application source code. The method may also include parsing the documentation file to determine a context of elements within the documentation file. Furthermore, the method may include generating a model of the documentation file based on the context of the elements and storing the model in a memory.

16 Claims, 7 Drawing Sheets

HOVER HELP SUPPORT FOR APPLICATION SOURCE CODE

FIELD OF INVENTION

Embodiments of the invention relate to the field of supporting software application development, and more particularly, to providing hover help in an integrated development environment.

BACKGROUND OF THE INVENTION

Software applications are often written and edited by users in graphical user interface environments. Because applications code is often reused, it is common to use pre-written or open source software in an application to impart functionality on the application without an application developer having to unnecessarily recreate applications code. Thus, the pre-written software packages include documentation that describes the various functions and capabilities of the software to inform other software developers how to use various functions, data structures, data types, etc. contained within the pre-written packages. The documentation often exists in a file, such as a text document, web page, postscript document file, etc., separate and distinct from the code library and graphical user interface. As a result, when a user desires documentation for a particular software element, attention must be diverted from the present task of writing and editing a software application to loading a documentation file, locating a description for a particular software element within the documentation file, and then reading through the documentation file.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for proving hover help support is described. In one embodiment, the method includes loading a documentation file generated from application source code. The method may also include parsing the documentation file to determine a context of elements within the documentation file. Furthermore, the method may include generating a model of the documentation file based on the context of the elements and storing the model in a memory.

Figure 1:
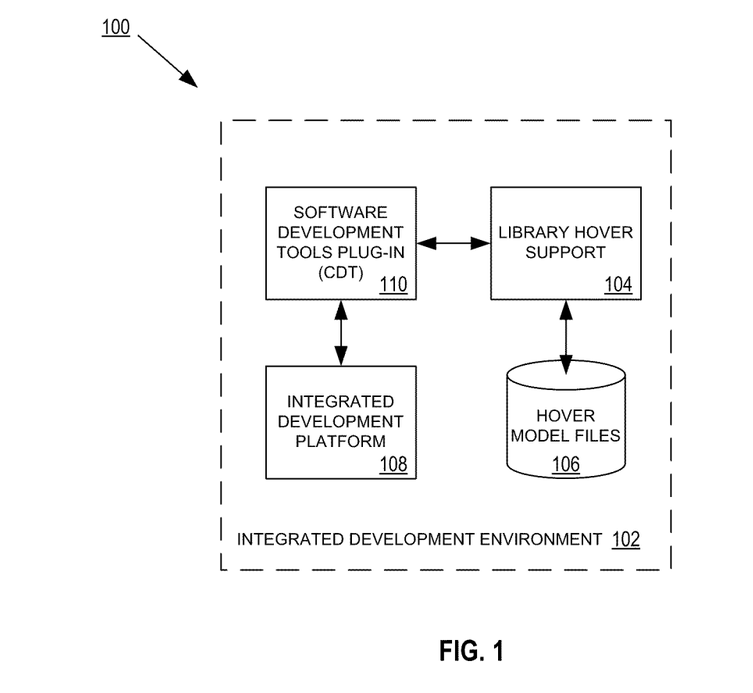
FIG. 1 is a block diagram of exemplary system for providing library hover support.

FIG. 1 is a block diagram of exemplary computer system 100 for providing library hover support. The computer system 100 may include one or more computing devices such as server computers, desktop computers, laptop computer systems, netbooks, etc. In one embodiment, the computer system 100 hosts an integrated development environment 102 that includes an integrated development platform 108, a software development tools plug-in 110, library hover support 104, and a data store to store library hover model files 106. For example, integrated development environment 102 may be the ECLIPSE™ multi-language software development environment for developing applications in software programming languages such as JAVA™, C, C++, Python, etc.

In one embodiment, integrated development platform 108 is run in a JAVA runtime environment. In one embodiment, integrated development platform 108 is a plug-in architecture and framework. In one embodiment, software development tools plug-in 110 is plugged into the integrated development platform 108. In one embodiment, the software development tools plug-in 110 is a C and C++ software development toolkit for tooling and developing C and/or C++ based software applications. The combination of the integrated development environment 108 and software development tools plug-in 110 provides a graphical interface and tools enabling a user to develop various software applications.

In one embodiment, software development tools plug-in 110 includes native hover help functionality. In one embodiment, hover help is a graphical user interface tool provided by software development tools plug-in 110 that supports software application development while using the software development tools plug-in 110. In one embodiment, hover help detects a user mouse-over event, such as a user directing a mouse cursor over a method function. The hover help of software development tools plug-in 110 then displays, such as in a popup window, secondary display pain, etc., text, graphics, or other media, corresponding to the element the user is mousing over. For example, if a user mouses over an icon of the software development tools plug-in 110, small text box that describes the icon may be generated by the native hover help of software development tools plug-in 110.

Figure 6:
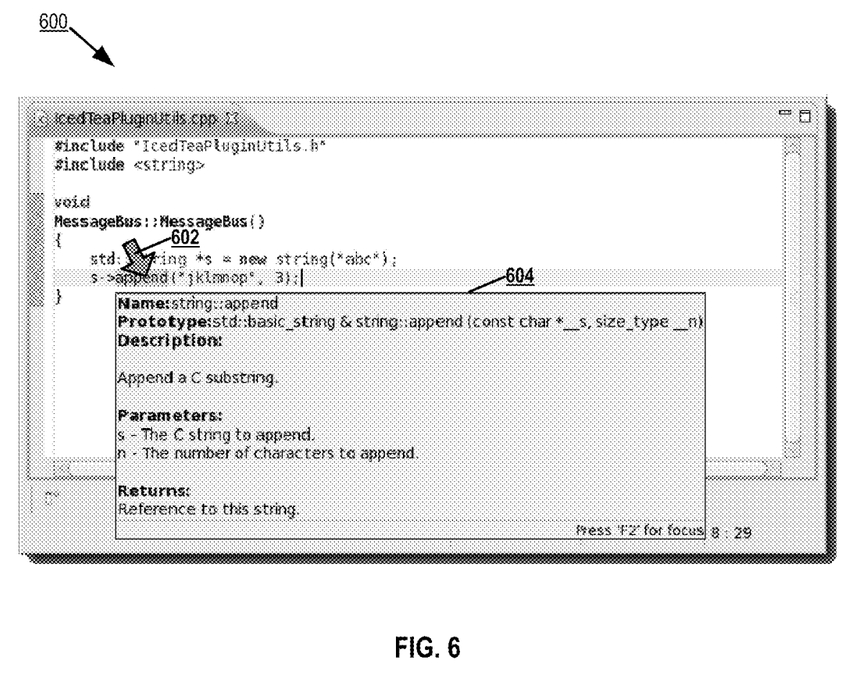
FIG. 6 illustrates an exemplary embodiment of a hover help display dialog box in a graphical user interface of the integrated development environment.

In one embodiment, software development tools plug-in 110 is coupled with library hover support 104. In one embodiment, library hover support 104 extends the native hover help functionality of software development tools plug-in 110 by providing data for software development elements, such as method functions, variables, arrays, typedefs, etc., displayed in a graphical user interface of software development tools plug-in 110. FIG. 6 illustrates an exemplary embodiment of a hover help display dialog box in a graphical user interface 600 of the integrated development environment 102. As illustrated, in response to a user mousing over the append method function 602, a dialog box 604 is displayed illustrating, for example, the method function's name, prototype, a brief description, input parameters of the method function, and the return value of the function type. Thus, a user developing a software application may mouse over a method function and be provided support documentation for the method function in near real time. In one embodiment, support for documentation of member functions belonging to C++ templates, base classes, and type definitions as well as overloaded methods may be provided to a user in response to a mouse over event.

In one embodiment, as discussed in greater detail below, library hover support 104 enables library hover functionality for elements in source code of a software application by parsing documentation generated from the software application's source code. In one embodiment, library hover support 104 creates a model, using the documentation data parsed from the documentation and written into pre-defined classes. In one embodiment, the hover models generated by library hover support 104 are stored in a data store as hover model files 106. The data store may be hosted by one or more storage devices that may consist of one or more types of removable storage and/or one or more types of non-removal storage.

In one embodiment, after library hover support 104 generates a hover model for a software application, software development tools plug-in 110 may query library hover support 104 in response to user mouse-over events for software applications being edited in the integrated development environment 102. For example, when a user mouses over the append member function 602 illustrated in FIG. 6, software development tools plug-in 110 may query library hover support 104 for support data, if any is available, for the append member function 602 belonging to the std::string class. In one embodiment, in response to the request of software development tools plug-in 110, library hover support searches the hover model files 106 for documentation data for the append member function 602. If any is found, library hover support 104 responds with the support data formatted for use by the software development tools plug-in's 110 native hover help. Thus, in one embodiment, library hover support 104 both generates the data models providing hover help data for C and C++ applications being developed in the integrated development environment, as well as searching for and supplying the data in response to hover help queries of the software development tools plug-in 110.

Figure 2:
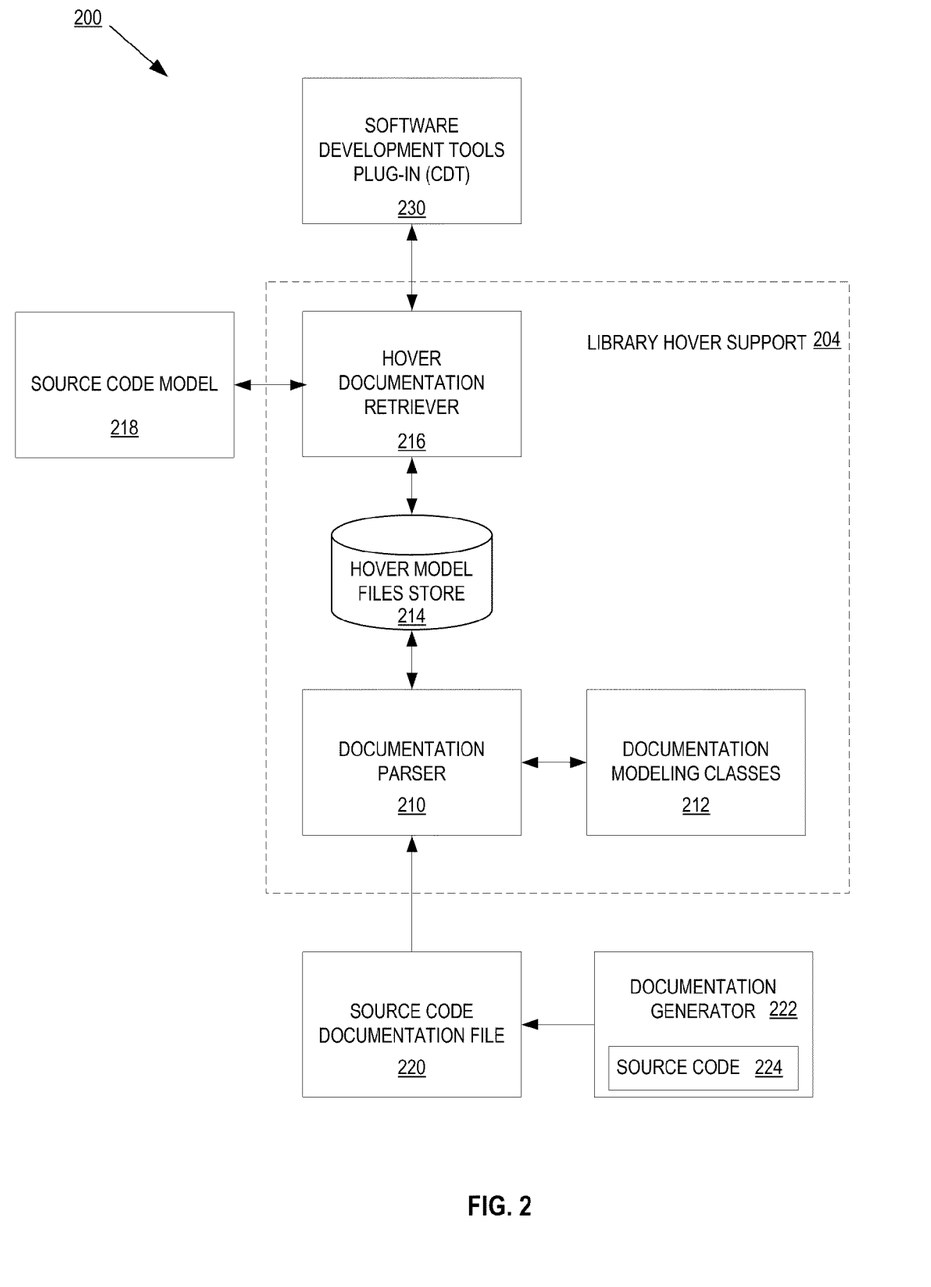
FIG. 2 is a block diagram of an architecture for providing library hover support in an integrated software development environment.

FIG. 2 is a block diagram of an architecture 200 for providing library hover support in an integrated software development environment. In one embodiment, the architecture 200 provides additional details for the library hover support 104 discussed above in FIG. 1. In one embodiment, library hover support 204 includes a documentation parser 210, documentation modeling classes 212, hover model files 214, and hover documentation retriever 216.

In one embodiment, documentation parser 210 is responsible for loading and parsing source code documentation files, such as source code documentation file 220. In one embodiment, the source code documentation file 220 is a text, PDF, HTML, XML, etc. file that is automatically generated by documentation generator 222 from a source code file 224. In one embodiment, source code documentation file 220 is an automatically generated documentation file, such as a DOXYGEN™ source code documentation file.

In one embodiment, after loading source code documentation file 220, documentation parser 210 reads through the contents of the source code documentation file 220. In one embodiment, for each software element documented in the software documentation file, documentation parser 210 writes documentation data from the source code documentation file 220 to the documentation modeling classes 212. In one embodiment, the documentation modeling classes are JAVA™ classes that may reference one another. In one embodiment, the classes are pre-written classes that support C++ software programming elements, such as type definitions, base classes, overloaded methods, and C++ templates.

For example, a method function documented by the source code documentation file 220, may be a method that operates on characters such as the append methods belonging to the C++ standard library basic_string class. The C++ standard library basic_string class has more than one method named append, but each method has a unique signature which defines the parameters it accepts and its return value. Thus, although the class discussed above has more than one append method, documentation parser 210 determines the specific context of the method call including its signature. The purpose for determining the specific context of a software element is to provide a user with accurate documentation for specific instantiations of the software element in response to a mouse over event. For example, one append method might take a single character and a repeat count as input parameters whereas another append method may take a string as input. The documentation for these two methods named append are different as the descriptions of the operations performed are not the same. The documentation parser, by determining a software element's context, provides support data for a function such as the input parameters, return types and parameters, a description, etc. corresponding to the actual usage of the software element. Such information is highly valuable and informative for users developing software applications, especially when the information is returned in an efficient manner.

In one embodiment, the documentation modeling classes 212 are predefined JAVA™ classes that receive documentation data written by documentation parser 210. In one embodiment, the documentation modeling classes 212 include predefined classes to create models for C and C++ software elements such as type definitions, templates, base classes, and overloaded methods. In one embodiment, the documentation modeling classes 212 may reference each other as determined by corresponding documentation for a software element. For example, a class may inherit from another class. All the exposed methods of the inherited class are accessible to the inheritor. A reference between the inheritor class and the inherited class is established in the model.

In one embodiment, a set of classes are created with references between the classes, as discussed above, in order to create a model of the source code documentation file 220. In one embodiment, the model is written to a file and stored in a data store, such as hover model files store 214. In one embodiment, the model classes are serialized in binary format files and then stored in hover model files store 214 so as to improve the performance of responding to hover help support requests. In one embodiment, JAVA™ serialization is utilized to serialize the documentation model files into binary for storage by the documentation parser 210.

In one embodiment, hover documentation retriever 216 is coupled with the memory storing hover model file 214. In one embodiment, hover documentation retriever 216 responds to hover help requests from the software development tools plug-in 230. In one embodiment, hover documentation retriever 216 receives the request that includes data regarding the text element in the source file that the cursor is hovering over. In one embodiment, hover documentation retriever 216 accesses a source code model 218 to determine a context of the text element in the source code. In one embodiment, the source code model 218 is a model generated by the integrated development environment 102 for the source code being edited by a user. In one embodiment, the context may refer to the specific data a software element operates on, how the software element is defined, what data types a software element returns, etc.

In one embodiment, hover documentation retriever 216 then searches the serialized hover model files 214 for a match. In one embodiment, for C++ programming language documentation files, the hover documentation retriever 216 maps a software object to a corresponding specific context using the source code model 218 of a user's source code. In one embodiment, upon finding documentation data from the set of classes for the context, hover documentation retriever 216 returns the documentation to software development tools plug-in 230. In one embodiment, hover documentation retriever 216 formats the documentation data into a format that software development tools plug-in 230 expects to receive (e.g., a predefined XML formatted response, universal resource locator, etc.).

In one embodiment, documentation parser 210 may parse and store multiple documentation models in hover model files 214. When there are multiple documentation models, hover documentation retriever 216 may search each of the models in response to a hover help request.

Figure 3:
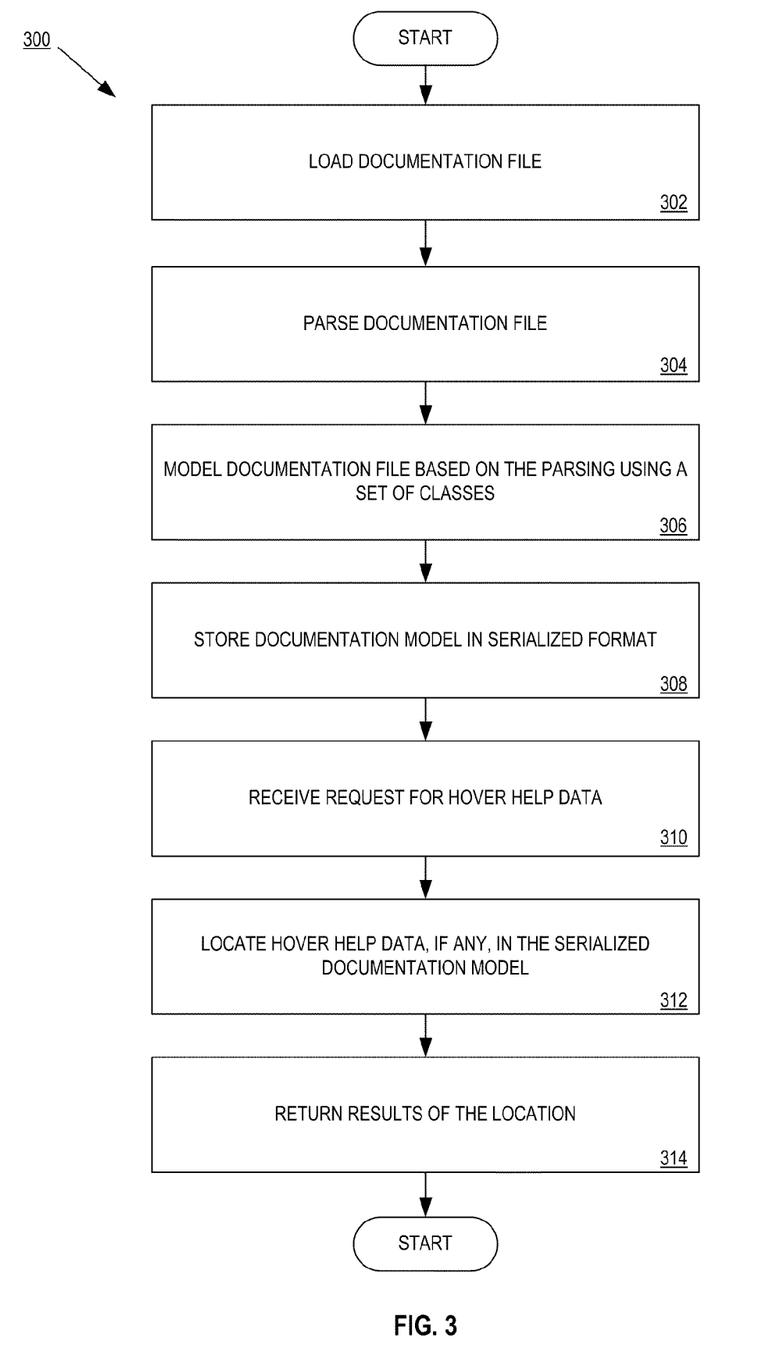
FIG. 3 is a flow diagram of one embodiment of a method for providing hover help for C++ software application development in an integrated development environment.

FIG. 3 is a flow diagram of one embodiment of a method 300 for providing hover help for C++ software application development in an integrated development environment. The method 300 is performed by processing logic that may comprise hardware (circuitry, dedicated logic, etc.), software (such as is run on a general purpose computer system or a dedicated machine), or a combination of both. In one embodiment, the method 300 is performed by library hover support 204 of FIG. 2.

Referring to FIG. 3, the process begins by loading a documentation file (processing block 302). In one embodiment, the documentation file is a documentation file that is automatically generated by a source code analysis tool. For example, the documentation file may be a DOXYGEN™ source code documentation file.

Processing logic parses the documentation file (processing block 304). In one embodiment, processing logic parses the documentation file to determine what software elements, such as method functions, base classes, type definitions, C++ templates, etc. are included in the source code of the software from which the documentation file was created.

Processing logic models the documentation file based on the parsing using a set of classes (processing block 306). In one embodiment, the set of classes is a set of JAVA™ classes. In one embodiment, the set of JAVA™ classes are predefined and correspond to typical use cases of a software element, such as classes corresponding to type definitions, classes corresponding to base class definitions, classes corresponding to C++ templates, and classes corresponding to overloaded method signatures within classes. Additional classes for C++ software elements may be provided consistent with the discussion herein. In one embodiment, the set of classes, as a whole, models the documentation file by modeling the methods, type definitions, C++ templates, and overloaded method signatures found in the documentation file, relationship between elements found in the documentation file, references between elements found in the documentation file, etc.

Processing logic then stores the documentation model in serialized format (processing block 308). In one embodiment, the documentation model is serialized utilizing JAVA™ serialization.

A request is then received for hover help data (processing block 310). In one embodiment, the hover help request includes data that indicates the subject of the request, such as a text element in source code hovered over by a user. For example, the request may specify a specific method name that a user is currently mousing over.

Processing logic locates the help data, if any, in the serialized documentation model (processing block 312). In one embodiment, processing logic locates an element in the documentation and then maps the element to a specific context corresponding to how the element is instantiated. For example, processing logic would map the software element to the input parameters, return types, etc. of the software element. In one embodiment, processing logic performs the mapping for software elements from C++ documentation models.

The results are then returned (processing block 314). In one embodiment, the results are returned in order to provide data that may be utilized to populate a hover help pop-up window, text box, etc. and displayed to a user editing source code.

Figure 4:
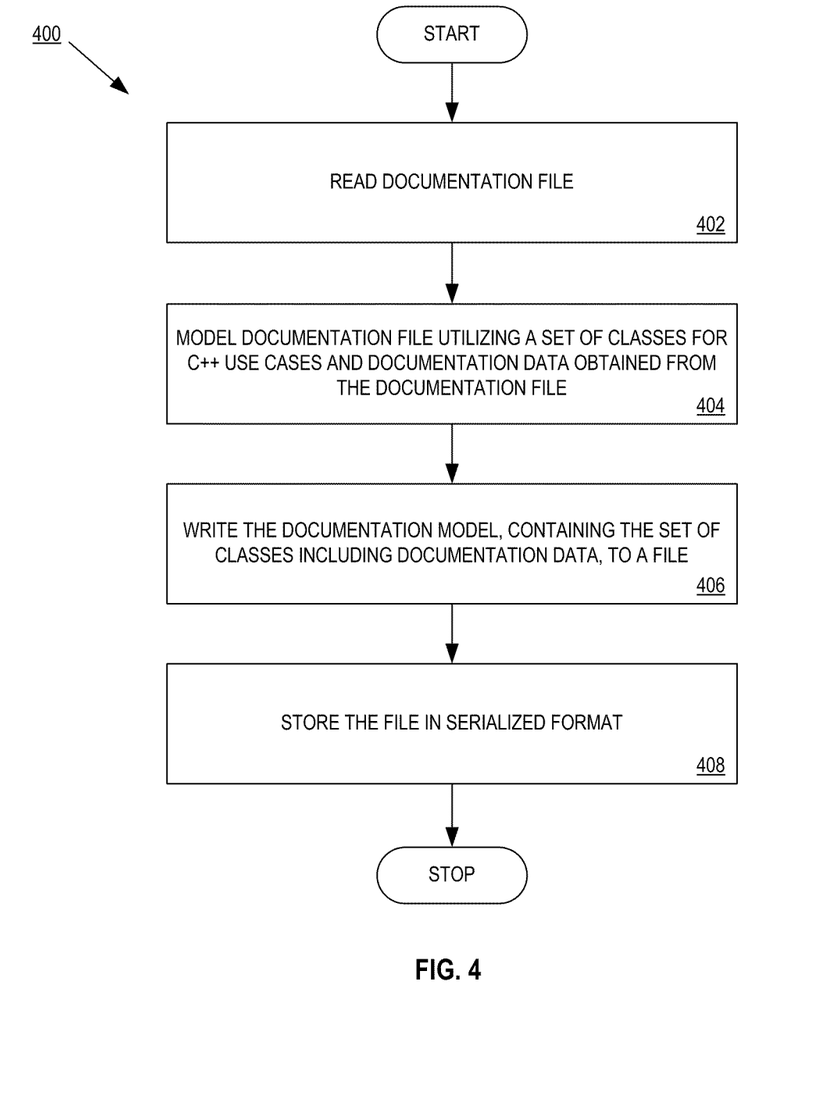
FIG. 4 is a flow diagram of one embodiment of a method for providing hover help for C++ software application development in an integrated development environment.

FIG. 4 is a flow diagram of one embodiment of a method 400 for providing hover help for C++ software application development in an integrated development environment. The method 400 is performed by processing logic that may comprise hardware (circuitry, dedicated logic, etc.), software (such as is run on a general purpose computer system or a dedicated machine), or a combination of both. In one embodiment, the method 400 is performed by library hover support 204 of FIG. 2.

Referring to FIG. 4, the process begins by reading a documentation file (processing block 402). In one embodiment, the documentation file is automatically generated from a source code documentation file by a documentation tool prior to processing logic reading the file. In one embodiment, the documentation file is an automatically generated source code documentation file, such as a DOXYGEN™ source code documentation file.

Processing logic models the documentation file utilizing a set of classes for C++ use cases as well as documentation data obtained from the documentation file (processing block 404). In one embodiment, the documentation file is structured top-down to provide documentation information about classes, typedefs, member functions, and structures within the classes, typedefs, and member functions.

In one embodiment, a class may be a template class and/or it may refer to one or more base classes. In one embodiment, the classes, base classes, and template classes represented in the documentation file are analyzed to obtain the member functions which have relevant documentation. For example, when documentation information is found for a class called A, processing logic would create a "Class" object, utilizing the pre-defined modeling classes, and give the newly created class the name A. A may have a set of base classes it references, and the base classes will be referenced in a resulting documentation model from the "Class" object named A.

Continuing the example, if B is a base class of A, A will have a reference to the "Class" object with name B. Any members of A will show up as children of A and these will be "Member" objects. Each "Member" object includes the associated documentation. In one embodiment, a hash table is created of "Class" objects which can be quickly searched using a look-up by name.

In one embodiment, template classes are modeled differently because the name of a template class may change based on how a users uses and/or defines the template class. In one embodiment, templates are special versions of classes and are named in the documentation model without their template parameters. For example, public class K<T> is stored in a "Class" named K which is marked as having template parameter T. If versions of the template K are specified in the documentation, they will be referenced by the generic K template class object that does not dictate the type of the T template parameter. Thus, if a look-up was performed on a version of template K, for example K<int>, the K class object is found in the model and a check is performed to see if there is a referenced template sibling class object of K where T is defined to be "int". This occurs when documentation is provided for various values of template type parameters. If there is not a specific instance for the context of template K<int>, the original template of K<T> may be utilized to provide documentation. The type "int" is then substituted for T for any member signatures and documentation. Thus, a member with signature T z(T) would match a look-up for a member with signature int z(int). In one embodiment, the documentation might reference T (e.g. returns type T) and processing logic would substitute "int" before returning the documentation. In one embodiment, typedefs are saved in a separate set of modeling classes and map one name to another, but also have to provide for templates as discussed above.

Processing logic writes the documentation model, containing the set of classes including documentation data written to the classes, to a file (processing block 406). The file is then serialized and stored in a memory (processing block 408). In one embodiment, the file is serialized into binary format to increase the efficiency of the subsequent hover help look-ups discussed herein.

Figure 5:
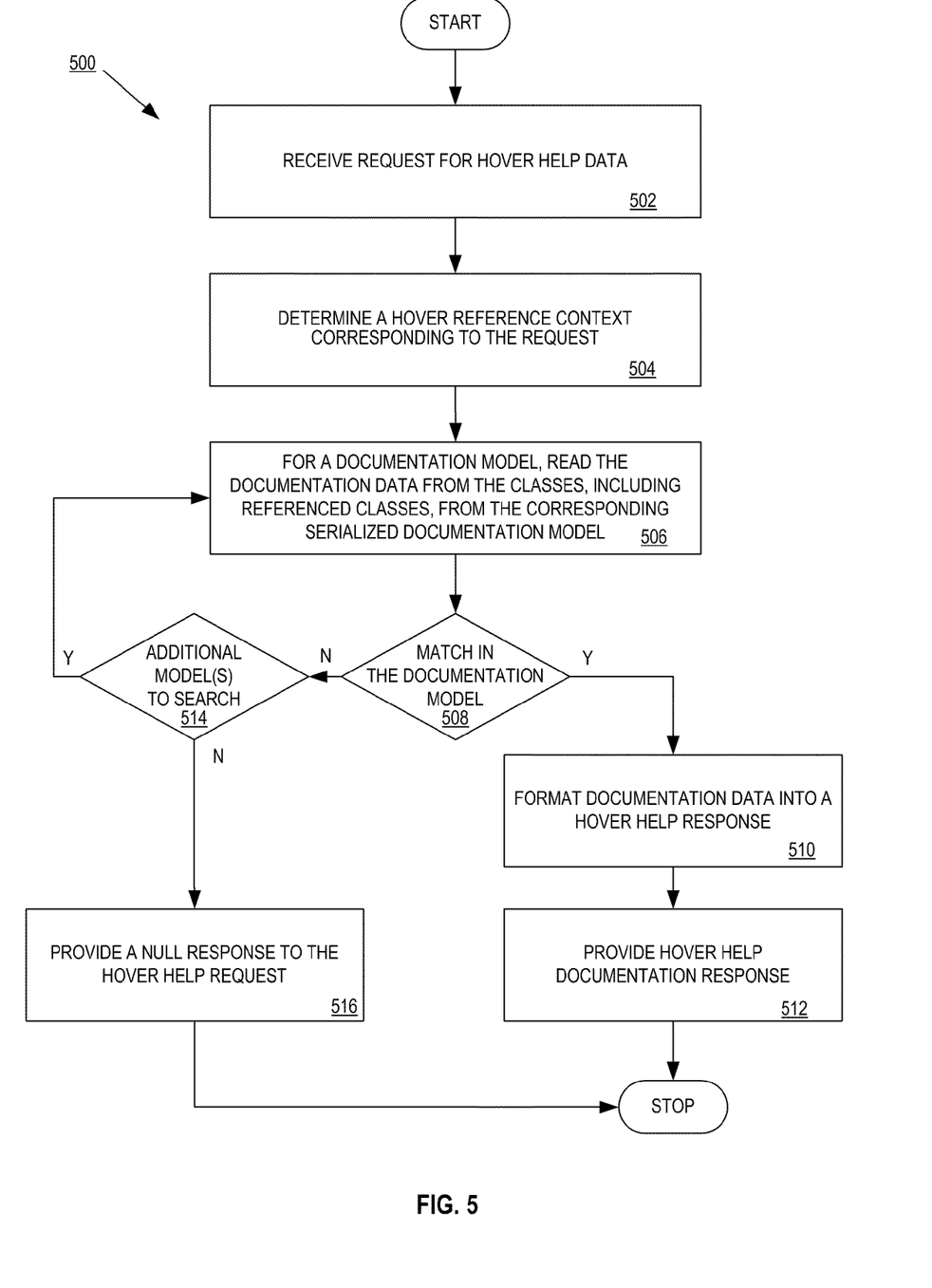
FIG. 5 is a flow diagram of one embodiment of a method for providing hover help for C++ software application development in an integrated development environment.

FIG. 5 is a flow diagram of one embodiment of a method 500 for providing hover help for C++ software application development in an integrated development environment. The method 500 is performed by processing logic that may comprise hardware (circuitry, dedicated logic, etc.), software (such as is run on a general purpose computer system or a dedicated machine), or a combination of both. In one embodiment, the method 500 is performed by library hover support 204 of FIG. 2.

Referring to FIG. 5, the process begins by receiving a request for hover help data (processing block 502). In response, processing logic determines a hover reference context corresponding to the request (processing block 504). In one embodiment, the context of a text element in source code that a user is mousing over is determined including the declared class type and the method signature being referenced for the source code element. In one embodiment, processing logic utilizes a source code indexer of the software development tools plug-in 110 to obtain the text elements context within the development environment.

Processing logic reads the documentation data from the classes, including classes referenced by the classes in the documentation model file, from the corresponding serialized documentation model (processing block 506).

Processing logic then determines whether there is a match in the documentation model (processing block 508). In one embodiment, when there is no match for a documentation model, processing logic determines if there are any additional documentation models (processing block 514). When there are additional documentation models, processing logic returns to processing block 506 to read a new documentation model. However, when processing logic determines that there are no additional documentation models to search (processing block 514), processing logic provides a null response to the hover help request (processing block 516). In one embodiment, the null response indicates that no documentation is available for the requested software element.

Where processing logic determines that there is a match in the documentation model, processing logic formats documentation data into a hover help response (processing block 510). In one embodiment, the hover help response formatted data corresponds to data a native hover help in a software development tools plug-in, such as the ECLIPSE™ C/C++ development toolkit, would expect to receive. Processing logic then provides the hover help documentation response to the requester (processing block 512) for display to a user.

Figure 7:
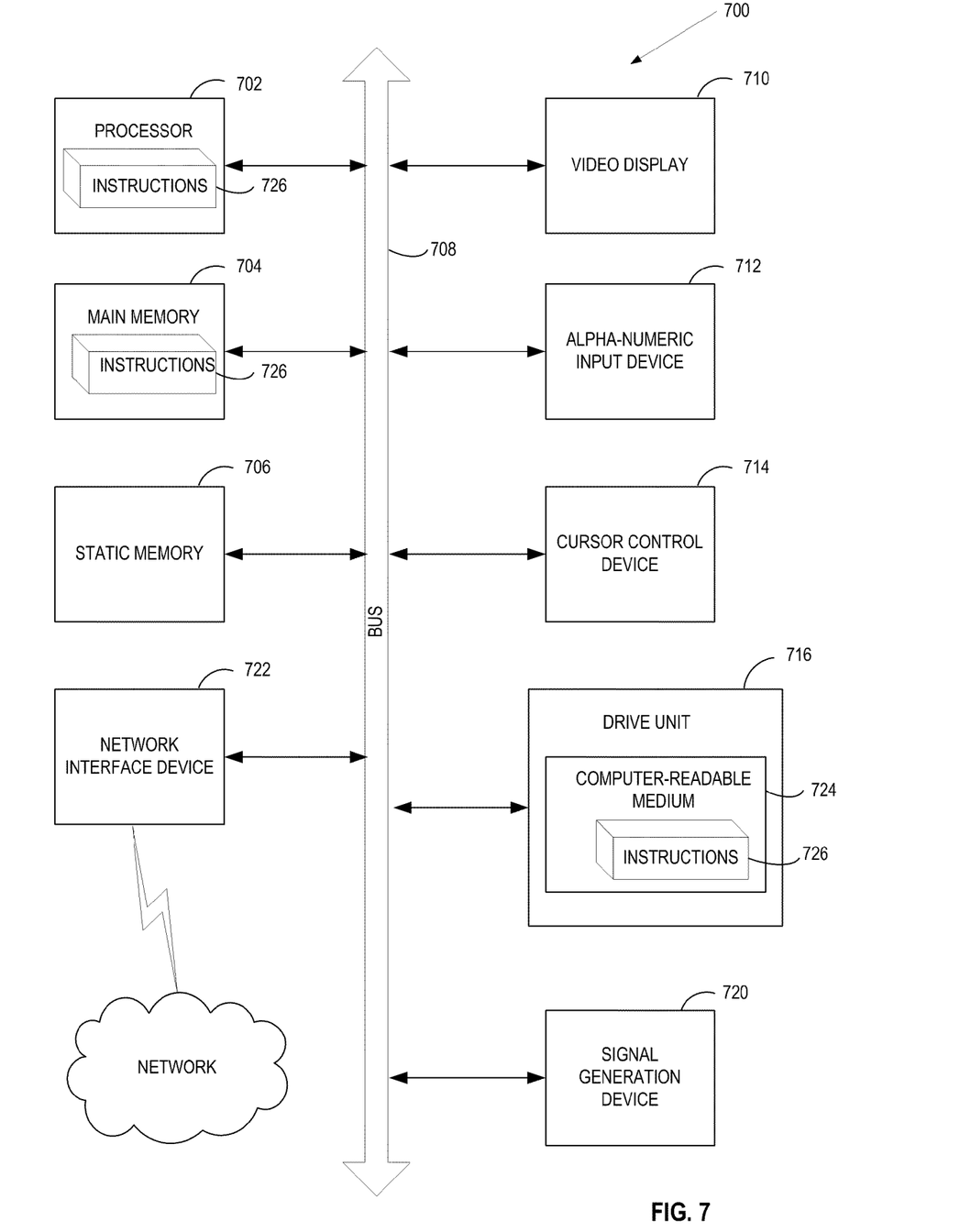
FIG. 7 illustrates a diagrammatic representation of a machine in the exemplary form of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 716 may include a machine-accessible storage medium 724 on which is stored one or more sets of instructions (e.g., software 726) embodying any one or more of the methodologies or functions described herein. The software 726 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

While the machine-accessible storage medium 724 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

I claim:

1. A method comprising:
    loading a documentation file, the documentation file generated from application source code;
    parsing, by a processing device, the documentation file to determine a context of a plurality of elements within the documentation file, wherein the context of each element defines a specific instance of an element, the context comprising an input parameter of the element;
    generating, by the processing device, a model of the documentation file in view of the context of the plurality of elements, the generating comprising:
        writing documentation data, parsed from the documentation file, to a set of classes to model the plurality of elements of the documentation file, and
        creating a mapping between classes from the set of classes to model the context in view of a mapping of corresponding elements from the documentation file;
    storing the model in a memory;
    receiving, from a user, a request for help identifying a source code element and associated context;
    locating documentation data in the model corresponding to a specific instance of the source code element in view of the associated context; and
    providing the located documentation data to the user.

2. The method of claim 1, wherein creating the mapping further comprising: consulting a model of the source code to determine a class context for the mapping between classes.

3. The method of claim 1, wherein the set of classes are predefined classes that model the plurality of elements of the application source code, the plurality of elements comprising at least one of source code type definitions, C++ templates, base classes, or overloaded method signatures.

4. The method of claim 1, wherein storing the model in the memory further comprises:
    writing the generated model to a file; and
    serializing the file comprising the generated model into serialized binary data.

5. The method of claim 1, wherein locating documentation data further comprises:
    searching a plurality of documentation model files; and
    providing the located documentation data when a first successful match corresponding to the request is found.

6. The method of claim 1, wherein providing the located documentation data further comprises:
    formatting the located documentation data into a hover help response; and
    displaying the formatted located documentation data to the user via a hover help display dialog box.

7. The method of claim 6, further comprising: providing a NULL response when there are no matches corresponding to the request.

8. The method of claim 1, wherein the application source code is C++ application source code.

9. A non-transitory computer readable medium comprising instructions, which when executed by a processing device, cause the processing device to:
  load a documentation file, the documentation file generated from application source code;
  parse, by the processing device, the documentation file to determine a context of a plurality of elements within the documentation file, wherein the context of each element defines a specific instance of an element, the context comprising an input parameter of the element;
  generate, by the processing device, a model of the documentation file in view of the context of the plurality of elements, the generating comprising:
    writing documentation data, parsed from the documentation file, to a set of classes to model the plurality of elements of the documentation file, and
    creating a mapping between classes from the set of classes to model the context in view of a mapping of corresponding documentation elements from the documentation file;
  store the model in a memory;
  receive, from a user, a request for help identifying a source code element and associated context;
  locate documentation data in the model corresponding to a specific instance of the source code element in view of the associated context; and
  provide the located documentation data to the user.

10. The non-transitory computer readable medium of claim 9, the processing device to consult a model of the source code to determine a context for the mapping between classes.

11. The non-transitory computer readable medium of claim 9, wherein the set of classes are predefined classes that model the plurality of elements of the application source code, the plurality of elements comprising at least one of source code type definitions, C++ templates, base classes, or overloaded method signatures.

12. The non-transitory computer readable medium of claim 9, wherein to store the model in the memory further comprises:
  writing the generated model to a file; and
  serializing the file comprising the generated model into serialized binary data.

13. The non-transitory computer readable medium of claim 9, wherein to locate documentation data further comprises:
  searching a plurality of documentation model files; and
  providing the located documentation data when a first successful match corresponding to the request is found.

14. The non-transitory computer readable medium of claim 13, the processing device to provide a NULL response when there are no matches corresponding to the request.

15. The non-transitory computer readable medium of claim 9, wherein the application source code is C++ application source code.

16. A system comprising:
  a memory comprising instructions; and
  a processing device operatively coupled to the memory, the processing device to execute the instructions to:
    load a documentation file generated from application source code,
    parse the documentation file to determine a context of a plurality of elements within the documentation file, wherein the context of each element defines a specific instance of an element, the context comprising an input parameter of the element,
    generate a model of the documentation file based on the context of the plurality of elements,
      write documentation data, parsed from the documentation file, to a set of classes to model the plurality of elements of the documentation file, and
      create a mapping between classes from the set of classes to model the context in view of a mapping of corresponding elements from the documentation file,
    store the model in a memory,
    receive, from a user, a request for help identifying a source code element and associated context
    locate documentation data in the model corresponding to a specific instance of the source code element in view of the associated context, and
    provide the located documentation data to the user.

* * * * *